US011229153B2

(12) United States Patent
Plattner

(10) Patent No.: US 11,229,153 B2
(45) Date of Patent: Jan. 25, 2022

(54) LOAD SENSOR BRACKET

(71) Applicant: Precision Planting LLC, Tremont, IL (US)

(72) Inventor: Chad E. Plattner, Tremont, IL (US)

(73) Assignee: Precision Planting LLC, Tremont, IL (US)

(*) Notice: Subject to any disclaimer, the term of this patent is extended or adjusted under 35 U.S.C. 154(b) by 0 days.

(21) Appl. No.: 17/257,619

(22) PCT Filed: Jun. 17, 2019

(86) PCT No.: PCT/IB2019/055022
§ 371 (c)(1),
(2) Date: Jan. 4, 2021

(87) PCT Pub. No.: WO2020/008283
PCT Pub. Date: Jan. 9, 2020

(65) Prior Publication Data
US 2021/0267114 A1 Sep. 2, 2021

Related U.S. Application Data

(60) Provisional application No. 62/853,376, filed on May 28, 2019, provisional application No. 62/693,435, filed on Jul. 2, 2018.

(51) Int. Cl.
A01B 63/16 (2006.01)
A01B 63/00 (2006.01)
A01C 5/06 (2006.01)

(52) U.S. Cl.
CPC ............ A01B 63/16 (2013.01); A01B 63/008 (2013.01); A01C 5/064 (2013.01)

(58) Field of Classification Search
CPC ......... A01B 63/16; A01B 63/14; A01B 63/00; A01B 63/002; A01B 63/008; A01C 5/064; A01C 5/062; A01C 5/06; A01C 5/00
See application file for complete search history.

(56) References Cited

U.S. PATENT DOCUMENTS

| | | | |
|---|---|---|---|
| 6,701,857 B1 | 3/2004 | Jensen et al. |
| 7,481,278 B1 | 1/2009 | Pomedli et al. |
| 7,814,847 B2 | 10/2010 | Schilling et al. |
| 7,984,768 B2 | 7/2011 | Schilling |
| 8,186,287 B2 | 5/2012 | Schilling et al. |
| 8,235,134 B2 | 8/2012 | Schilling |

(Continued)

OTHER PUBLICATIONS

European Patent Office, International Search Report for parent International Application No. PCT/IB2019/055022, dated Oct. 16, 2019.

Primary Examiner — Christopher J. Novosad

(57) ABSTRACT

A load sensing bracket for a disk opener assembly of an agricultural implement. The load sensing bracket includes a body having a cantilevered arm, the body is configured to engage with and secure to a portion of a depth setting arm of a disc opening assembly. The cantilevered arm has an upper end with an extending projection that is receivable in any one of plurality of notches of a fan shaped member thereby setting a position of the depth setting arm relative to the fan shaped member which sets a position of the gauge wheel relative to the disk. A sensor is disposed on the cantilevered arm generating a signal relating to strain in the cantilevered arm which corresponds to a down pressure on the gauge wheel.

18 Claims, 15 Drawing Sheets

(56) References Cited

U.S. PATENT DOCUMENTS

| | | |
|---|---|---|
| 8,275,525 B2 | 9/2012 | Kowalchuk et al. |
| 8,479,670 B2 | 7/2013 | Schilling et al. |
| 8,646,395 B2 | 2/2014 | Schilling et al. |
| 8,672,047 B2 | 3/2014 | Schilling |
| 8,985,234 B2 | 3/2015 | Gadzella et al. |
| 9,826,677 B2 | 11/2017 | Gervais et al. |
| 9,968,030 B2 | 5/2018 | Kowalchuk et al. |
| 2011/0108295 A1 | 5/2011 | Schilling |
| 2011/0313572 A1 | 12/2011 | Kowalchuk et al. |
| 2015/0020612 A1 | 1/2015 | Witt et al. |

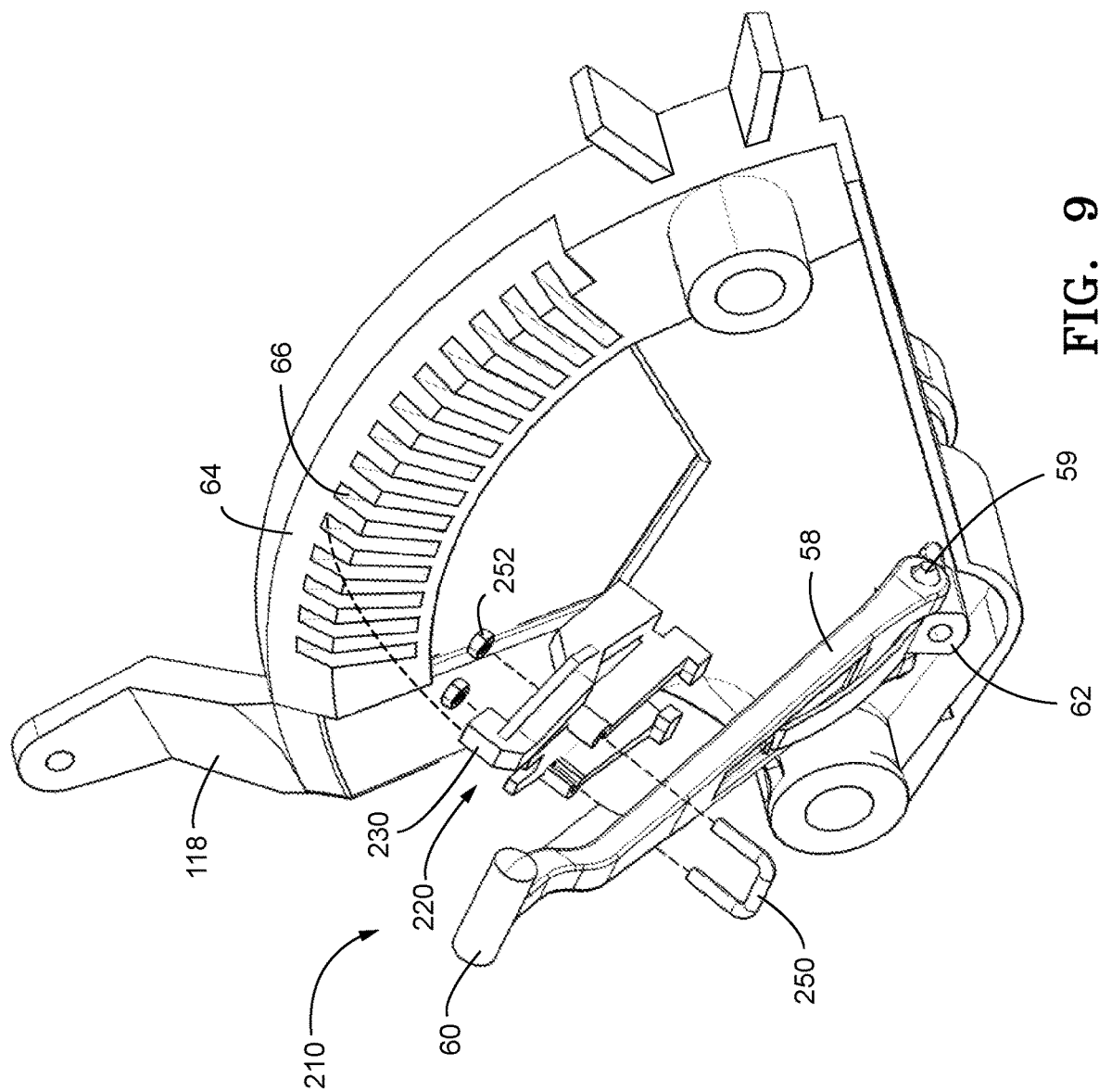

LOAD SENSOR BRACKET

BACKGROUND

As disclosed in U.S. Pat. Nos. 8,275,525, 9,826,677 and 9,968,030, each of which is incorporated herein by reference in its entirety, and as commercially embodied in the Case 500 Series planter, the planter includes a toolbar adapted to be drawn by a tractor with a number of row units spaced along the length of the toolbar. Each row unit includes a disk opener assembly having a disk or coulter that cuts a furrow or trench into the soil as the row unit advances in a forward direction of travel. The disk opener assembly includes a gauge wheel which controls the depth at which the disk or coulter penetrates into the soil and thus the depth of the furrow. The furrow depth (i.e., the position of the gauge wheel with respect to the disk or coulter) is typically set by rotating a lever or control arm to one of a series of depth setting positions. The row unit also typically includes a down pressure system, which utilizes a hydraulic cylinder and/or a spring, to apply a down force on the row unit to ensure that the disk or coulter penetrates into the ground to the set depth. For most planters, the amount of down force can be adjusted by the operator to accommodate different soil conditions.

Notwithstanding the ability to vary the down force to changing soil conditions, many operators are unsure as to the appropriate down pressure setting for a given soil condition. As a result, many operators will set the down pressure to exert an excessive amount of down force and leave the setting unchanged. Excess down force can result in undue soil compaction which can adversely affect root growth and result in other yield robbing conditions. In addition, constantly operating the planter with the down pressure system set to the maximal down pressure setting can cause premature failure or wear of the gauge wheel, control lever, and/or gauge wheel bearings.

It is known that the strain placed on a gauge wheel assembly will change as soil conditions change. This change in strain can be measured by a load sensor and the strain changes may be used to reactively change the amount of down force that is applied by the down pressure cylinder to a disk or a set of disks ganged together. The load sensor, which may be a strain gauge for example, senses the strain placed on the gauge wheel assembly during a change in soil conditions. If the soil conditions soften, the down force applied by the down pressure cylinder will initially stress the gauge wheel assembly as the gauge wheel counters the down force applied. In such an instance, the load sensor detects the increased strain and provides the information to a controller that provides appropriate control signals to a valve that controls the flow and/or pressure of hydraulic fluid to the down pressure cylinder so that the amount of down force applied to the disk is reduced. On the other hand if the soil conditions harden, the down pressure will be insufficient to drive the disk to the desired penetration depth and a corresponding strain will be measured by the load sensor. Appropriate control signals are communicated to the valve to change the flow of hydraulic fluid so as to increase the amount of down force applied.

While the down pressure control system disclosed in U.S. Pat. Nos. 8,275,525, 9,826,677 and 9,968,030 and commercially embodied in the Case 500 Series planter may serve the intended purpose, there is a need for a more simplified load sensor for use in automatically and continually adjusting the down pressure applied to the disk opener (or to the set of disk openers ganged together) in response to changes in soil conditions to maintain the disk opener or set of disk openers at a relatively constant penetration depth so that the disk cuts an elongated furrow in the soil at a substantially constant depth.

BRIEF DESCRIPTION OF THE DRAWINGS

FIG. 9 shows the load sensor bracket of FIG. 8 being mountable onto the depth setting arm without having to remove the depth setting arm from the fan shaped member.

DESCRIPTION

Figure 1:
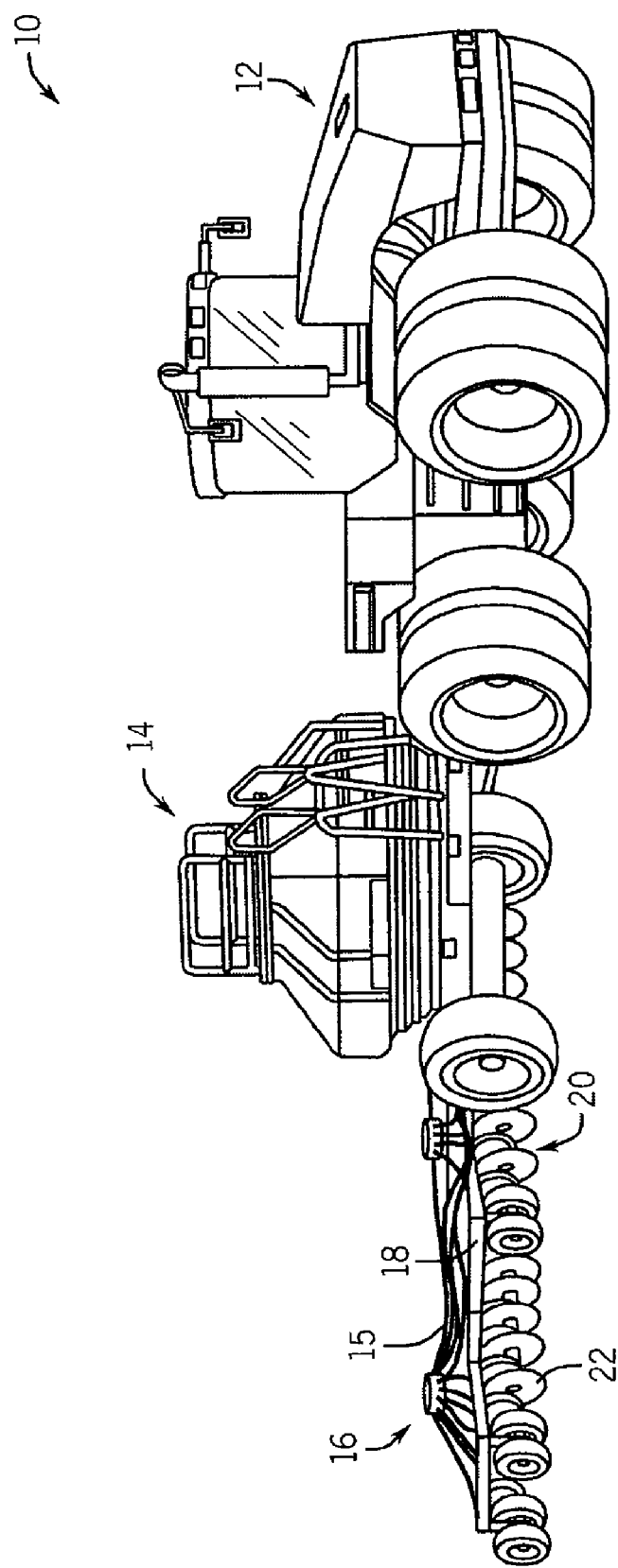
FIG. 1 is a pictorial view of an embodiment of a prior art agricultural planting system generally comprised of tractor, an air cart, and an air seeder.

FIG. 1 illustrates an embodiment of an existing agricultural seeding system 10 which includes an air cart 14 and an air seeder 16. The air cart 14 and the seeder 16 are hitched to a tractor 12 in a conventional manner which draws the air seeder 16 and air cart 14 through the field. The seeder 16 includes a tool bar 18 to which a set of row units 20 are coupled. The row units 20 each include a disk 22 designed to cut a trench or furrow into the soil. As known in the art, the air cart 14 pneumatically delivers seed and/or fertilizer to a set of delivery tubes 15 of the seeder 16 whereupon the seed and/or fertilizer is deposited in seed trenches or furrows cut by the disks 22. As further known in the art, the seeder 16 includes a hydraulic system comprised of a network of hydraulic cylinders, valves, and conduits that are flow-coupled to a hydraulic fluid source, typically carried by the tractor 12. The hydraulic system is operable to perform various functions associated with operation of the seeder 16. For example, the seeder 16 is moved between a raised, transport position and a lowered, field engaging position by a hydraulically controlled down pressure assembly. For folding seeders, the hydraulic system can also be used to fold the seeder 16 to have a narrow profile, which is better suited for transport and storage.

Figure 2:
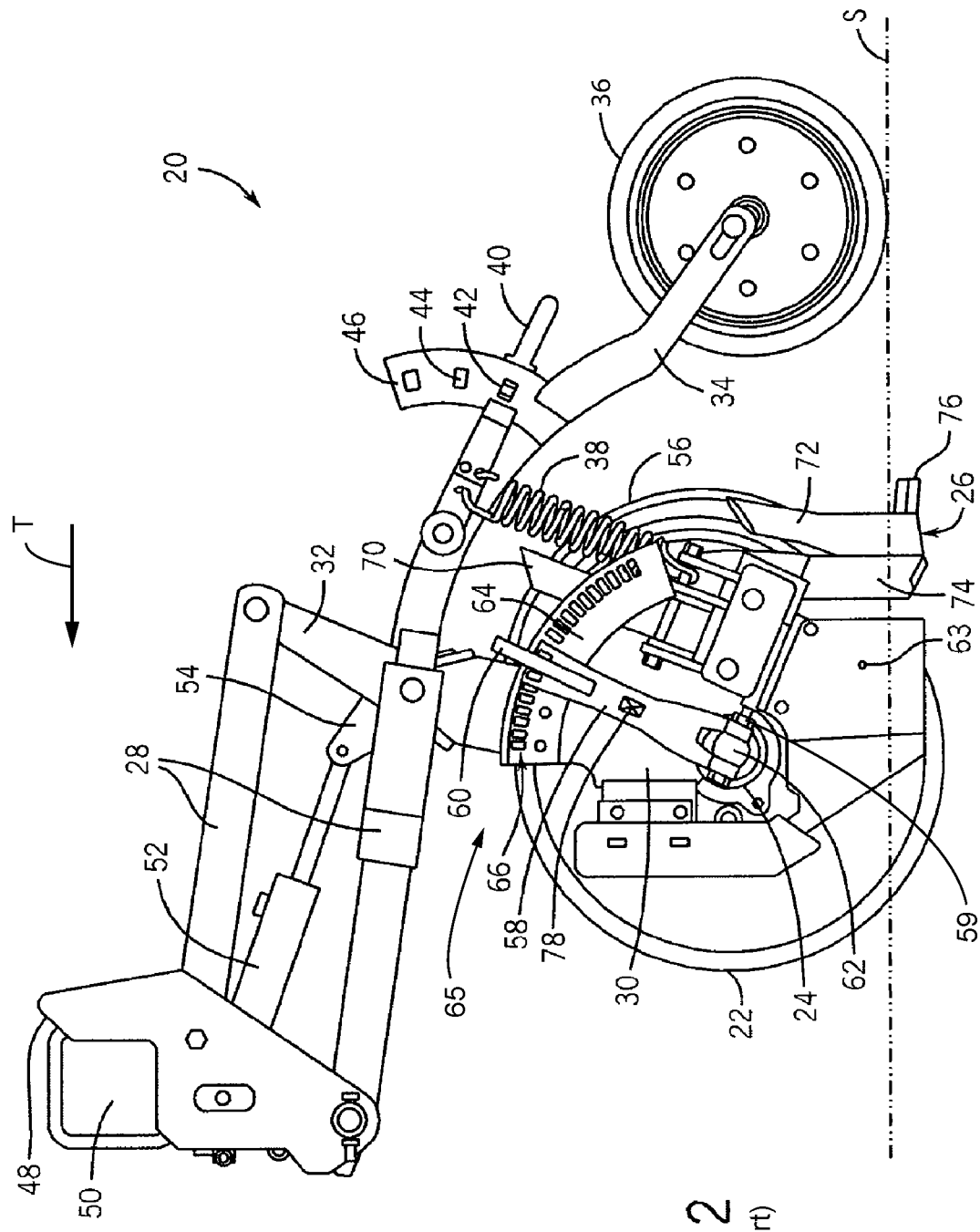
FIG. 2 is a side elevation view of a prior art row unit of the air seeder of FIG. 1.
Figure 5:
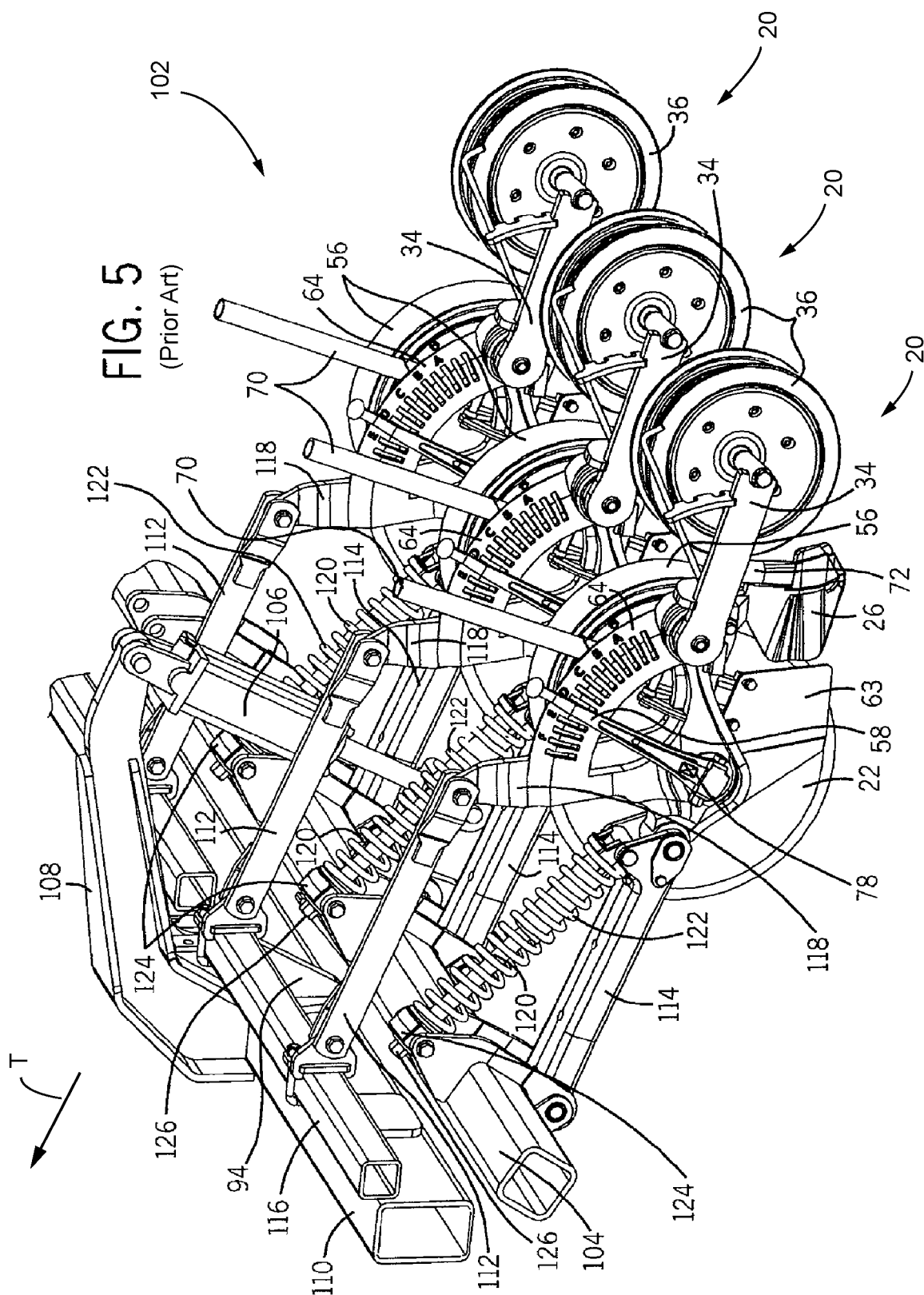
FIG. 5 is a perspective view showing a plurality of row units of FIG. 2 arranged as a row unit gang.

FIG. 2 is a side elevation view of one of the row units 20 of the air seeder 16 and FIG. 5 is a perspective view of a gang 102 of row units 20. The row unit 20 generally includes a forward disk 22 that is angled relative to a line of travel T. As known in the art, the forward disk 22 rotates about a center hub 24 to cut a furrow into the soil S. A seed boot 26 is mounted rearward of the disk 22, and is designed to cut a seed trench into the furrow formed by the disk 22. The disk 22 is coupled to a parallel linkage 28 by a disk mount 30, to which a mount arm 32 is welded and extends upwardly from the disk mount 30. A trailing arm 34 is also coupled to the parallel linkage 28 and a press or packing wheel 36 is coupled to the trailing arm 34. The press wheel 36 trails the disk 22 and the seed boot 26, and as known in the art, applies a packing pressure to the furrow. The packing force is applied by spring 38, but it is understood that other biasing devices may be used. In addition, the amount of packing force can be varied via lever 40 which has a selector member 42 that can be selectively positioned in one of a series of notches 44 of curved member 46.

The parallel linkage 28 is also coupled to a toolbar mount 48 that is operative to couple the row unit 20 to a toolbar 50 of the seeder 16. A hydraulic cylinder 52 is pivotably coupled to the toolbar mount 48 and the mount arm 32 by a bracket 54. The cylinder 52 is operative to apply a downward pressure on the disk 22 to force the disk 22 to penetrate the seeding surface. The depth at which the disk 22 cuts into the soil is controlled by a depth adjustment assembly designated generally by reference number 65. The depth adjustment assembly 65 is used to selectively position a gauge wheel 56 with respect to the disk 22. The depth adjustment assembly 65 includes a depth setting arm 58 which has a handle 60 at one end. The opposite end of the depth setting arm 58 is coupled via a pin 59 (FIGS. 2, 6 and 7) to a crankshaft 62 that extends through the center of the gauge wheel 56 and a fan shaped member 64. The depth setting arm 58 is held in place by engagement of an inwardly extending fin or tooth 61 (FIGS. 6 and 7) that is received within one of the series of outwardly facing notches 66 of the fan shaped member 64. By selectively positioning the inwardly extending tooth 61 of the depth setting arm 58 in one of the respective outwardly facing notches 66 of the fan shaped member 64, the relative position of the depth setting arm 58 with respect to the fan shaped member 64 results in setting a position of the gauge wheel 56 relative to the disk 22, thus establishing the penetration depth of the disk 22 into the soil S. It should be appreciated that by raising of the gauge wheel 56 relative to the disk 22, the cutting depth of the disk 22 into the soil is increased and lowering the gauge wheel 56 relative to the disk 22 reduces the cutting depth of the disk 22 into the soil.

In addition to setting the depth at which the disk 22 cuts into the soil, the gauge wheel 56 keeps the outer surface of the disk 22 generally clear of mud and debris. A scraper blade 63 is mounted opposite the depth gauge wheel 56 is designed to remove dirt, mud, and other debris from the inner surface of the disk 22.

The row unit 20 shown in FIG. 2 is a single pass, double-shoot unit. In this regard, the row unit 20 is designed to cut a furrow, drop fertilizer, cut a seed trench, and drop seed in a single pass across the planting surface. Thus, a fertilizer tube 70 is mounted rearward of the center hub 24 of the disk 22, but forward of the seed boot 26. The seed boot 26 generally includes a seed tube 72 and a cutting member 74 that is forward of the seed tube 72. In operation, as the disk 22 forms a furrow having a relatively deep fertilizer trench in the planting surface, fertilizer is dropped into the fertilizer trench from a fertilizer source (not shown) that communicates with the aforementioned fertilizer tube 70. The cutting member 74 is offset from the disk 22 and cuts into a sidewall of the furrow to form a ledge or seed bed. Seed is then dropped via the seed tube 72 onto the ledge. The seed is fed to the seed tube 72 from a seed source in a known manner.

The cutting member 74 cuts into the sidewall of the furrow such that the ledge is offset horizontally and vertically from the fertilizer trench, i.e., bottom of the furrow. In this regard, the seed is deposited at a position that is spaced horizontally and vertically from the fertilizer that is dropped into the fertilizer trench. As noted above, it is generally preferred to place seed and fertilizer into a furrow with stratification between the fertilizer and the seed.

The cutting member 74 may be angled to lift the soil as the cutting member 74 is urged through the sidewall of the furrow. Thus, as the disk 22 and the cutting member 74 cut through the planting surface, the soil is temporarily displaced and lifted to form trenches for the deposition of fertilizer or seed. However, when disk 22 and the cutting member 74 pass, the soil will tend to fall back onto itself and effectively fill-in the furrow and thus the fertilizer and seed trenches. The press wheel 36, which trails the seed boot 26, then packs the fertilizer and the seed. Alternately, the cutting member 74 may be angled downward to force the soil down onto the fertilizer before the seed is deposited onto the seed bed.

A deflector tab 76 may extend from the rearward side of the seed tube 72. The deflector tab 76 generally provides two separate functions. First, the deflector tab 76 is angled as is the lower ends of the seed tube 72 and the cutting member 74. With this angled orientation, the deflector tab 76 is operative to encourage seed toward the seed trench. Second, because of its proximity to the seed tube 72, the deflector tab 76 reduces the ingress of soil and debris into the seed tube 72 during roll back of the planting unit 20.

As noted above, the pressure in the hydraulic cylinder 52 sets the amount of down pressure that is applied on the disk 22 and the gauge wheel 56. In a preferred method of operation, a user rotates the depth setting arm 58 to a desired depth setting at which the disk 22 is to cut a trench or furrow in the planting surface. The down pressure applied by the cylinder 52, together with the weight of the planting unit 20, forces the disk 22 into the planting surface so that the trench or furrow is cut at the user selected depth. As described above, conventionally, many users, independent of the gauge wheel setting, have a maximum down force applied on the disk. Users will often do this because they are not sure how much down pressure is needed. However, continued excessive down pressure can cause premature failure of the gauge wheel, the depth setting mechanisms, and/or gauge wheel bearings.

As such, in accordance with one embodiment, the row unit 20 has a sensor 78, such as a strain gauge or load cell, mounted to the depth setting arm 58. The signals generated by the sensor 78 are used to control the flow of hydraulic fluid to or from the hydraulic cylinder 52 and thus the amount of down force applied on the disk 22 and the gauge wheel 56. In this regard, the amount of down force applied by the hydraulic cylinder can be controlled substantially in real-time so the applied down pressure approximates the desired down pressure, thereby maintaining a desired seed depth without overstressing the gauge wheel and its related components.

Figure 3:
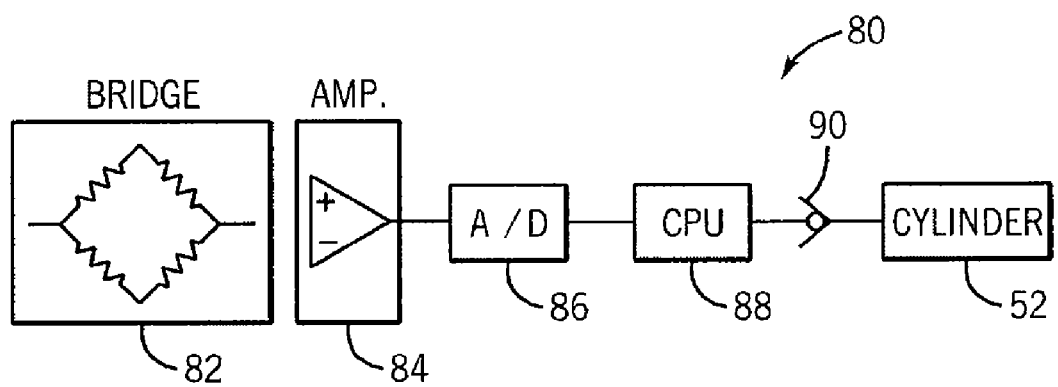
FIG. 3 is a schematic diagram of an embodiment of a prior art down pressure adjustment circuit for the row unit of FIG. 2.

Referring now to FIG. 3, a down pressure control system 80 includes the sensor 78 represented as a Wheatstone bridge 82 in communication with an amplifier 84 for amplifying the signal measured by the Wheatstone bridge 82. One skilled in the art will appreciate that a strain gauge can be schematically represented by a Wheatstone bridge. An A/D converter 86 is included for conversion of the analog signal detected by the bridge 82 to a digital signal. A CPU or processor 88 is provided to receive stain measurements as detected by Wheatstone bridge 82 and to determine if pressure in the cylinder 52 should be increased or decreased. Hydraulic fluid flow to and from the cylinder 52 is controlled by a valve 90 and thus the CPU 88 opens and closes the valve 90 as needed to adjust the pressure in the cylinder 52 and thus the amount of down pressure applied on the disk 22 and the gauge wheel 56 so the applied down pressure approaches the desired down pressure, thereby maintaining a relatively constant furrow depth and minimizing excessive down pressure on the gauge wheel.

Figure 4:
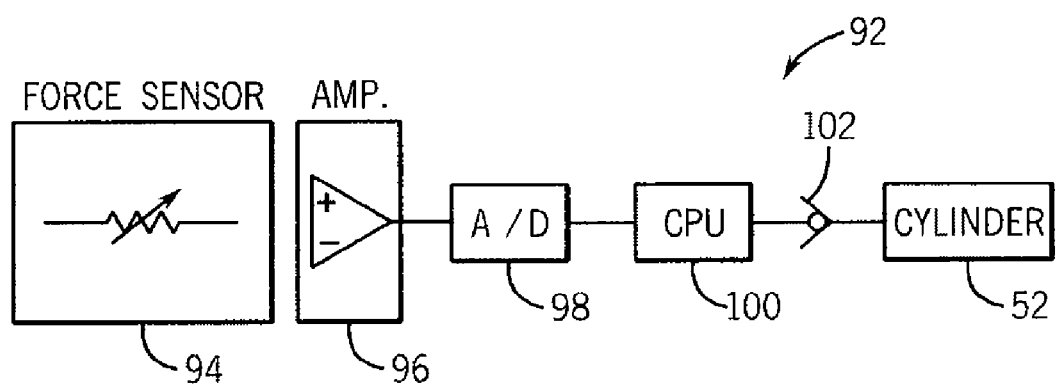
FIG. 4 is a schematic diagram of another embodiment of a prior art down pressure adjustment circuit for the row unit of FIG. 2.

FIG. 4 illustrates another embodiment of a down pressure control system 92. System 92 is substantially similar to the system 80 described above; however, in this embodiment, a force sensor 94 is used for measuring the force applied by the user rather than a Wheatstone bridge. Components 96 through 102 are similar to components 84 through 90 described above.

As referenced above, the drown pressure control system is applicable to different types of agricultural implements, such as seeders, planters, and the like. FIG. 2 illustrates one type of disk opener unit. FIG. 5 illustrates another type of disk opener arrangement in which multiple row units 20 are ganged together as a row unit gang 102 to a rockshaft 104. The rockshaft 104 is rotated by a hydraulic cylinder 106 that is coupled at one end to the rockshaft 104 and is coupled at the opposite end to a support arm 108 that is mounted to a tool bar 110 or other stationary frame member. Each row unit 20 of the row unit gang 102 includes a linkage assembly generally comprised of an upper link 112 and a lower link 114. Upper link 112 may be coupled at one end directly to the tool bar 110, or as illustrated in FIG. 5, is coupled to a rail 116 that is mounted to the tool bar 110. The opposite end of the upper link 112 is coupled to the disk opener bracket or mount 118. The lower link 114 is interconnected between the rockshaft 104 and the disk opener bracket 118. Also interconnected between the rockshaft 104 and the disk opener bracket 118 is a sleeve 120 which supports a spring 122. The spring 122 is coupled to a trunnion 124 at one end and coupled to the lower link 114 at its opposite end. The trunnion 124 is free to slide along the sleeve 120 with rotation of the rockshaft 104. A stop 126 is provided that sets a maximum on how far the spring 120 can be elongated when the rockshaft is rotated counterclockwise (in the figure) by the hydraulic cylinder 106. It will thus be appreciated that as the rockshaft 104 is rotated clockwise (in the figure) by the cylinder 106, the springs 122 will compress and apply down pressure on the row units 20 of the row unit gang 102. In this regard, the amount of down pressure for multiple row units 20 comprising the gang 102 is controlled by a single hydraulic cylinder. Strain measurements may then be taken from a sensor 78, e.g., strain gauge, mounted to one of the depth setting arms 58 of one of the row units 20 of the gang 102 and transmitted to CPU 88 as described above to control the amount of pressure in the hydraulic cylinder 106 and thus the amount of down pressure applied to the row units 20 of the gang 102. However, it is contemplated that load sensors could be mounted to the depth setting arms of each row unit 20 of the gang 102 and that the CPU could apply one of a number of statistical or numerical evaluations, e.g., averaging, on the multiple strain gauge readings to determine an appropriate down pressure adjustment.

In operation, an operator sets the gauge wheel 56 relative to the disk 22 to produce a desired seed depth by positioning the depth setting arm 58 at the corresponding location along the fan shaped member 64. The operator further sets the down pressure to a desired value based on experience and field conditions. As the seeder 16 is initially lowered into the field engaging position and the row units 20 begin to cut furrows or trenches into the planting surface, the sensor 78 provides feedback to the CPU 88 corresponding to the strain on the depth setting arm 58. Generally, if the amount of down pressure applied by the cylinder 52 (or 106) is excessive, the down pressure will try to force the disk 22 farther into the planting surface resulting in excessive down pressure on the gauge wheel 56 and an increase in strain (e.g., due to deformation or slight bending), of the depth setting arm 58, which will be detected by the sensor 78 (e.g., a strain gauge). On the other hand, if the down pressure applied by the cylinder 52 (or 106) is insufficient to hold the disk 22 at the desired furrow cutting depth, there will be little to no down pressure on the gauge wheel 56 and therefore little or no strain in the depth setting arm 58 will occur and be detected by the sensor 78. If the amount of down pressure is appropriate, a minimum threshold of strain on the depth setting arm 58 will occur. In this regard, as the disk 22 is pulled through the planting surface, strain measurements are taken and provided to the CPU, which in turn compares the measured strain values to a range of "no-action" values. That is, if the amount of strain falls within that range, the CPU will not effectuate any changes to the amount of pressure in the hydraulic cylinder 52 (or 106). This would be for events such as when the gauge wheel rolls over an obstacle such as a rock. However, if the stain measurements are outside the range of "no-action" values, the CPU will cause an increase or decrease in pressure in the hydraulic cylinder 52 (or 106) to vary the amount of down pressure the cylinder 52 (or 106) applies on the disk 22 and the gauge wheel 56. The range of "no action" values preferably has a width that avoids constant changing of the hydraulic pressure, but avoids undesirable over-force or under-force on the disk 22 and the gauge wheel 56.

In another implementation, by default, the hydraulic cylinder 52 (or 106) is set to provide a maximum down pressure on the disk 22 and gauge wheel 56. Strain in the depth setting arm is measured by the sensor 78 as the disk 22 is pulled through the planting surface and hydraulic pressure is reduced from the maximum level as appropriate based on feedback provided by the sensor 78. It is believed that initially setting the down pressure to a maximal level and then reducing the down pressure as needed provides two advantages. First, it ensures that there is initially enough down pressure for the disk 22 to cut through the planting surface to the desired cutting depth. Second, reducing the down pressure can be done relatively quickly to provide a quickened response time to achieve an optimized down pressure setting for a given soil condition.

Figure 6:
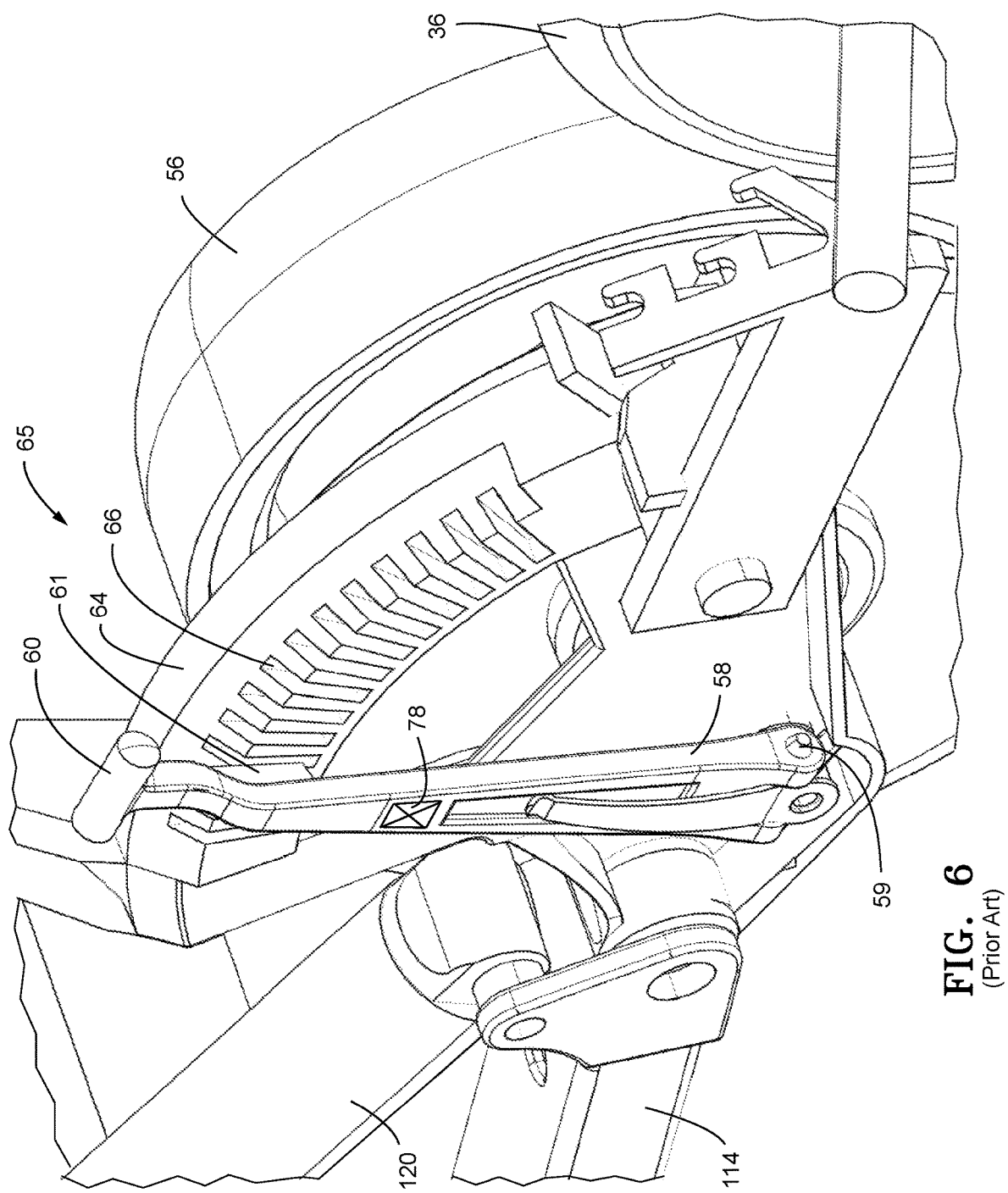
FIG. 6 is an enlarged perspective view of one of the row units of FIG. 5 showing the prior art depth adjustment assembly with the instrumented depth setting arm engaged with the fan shaped member.
Figure 7:
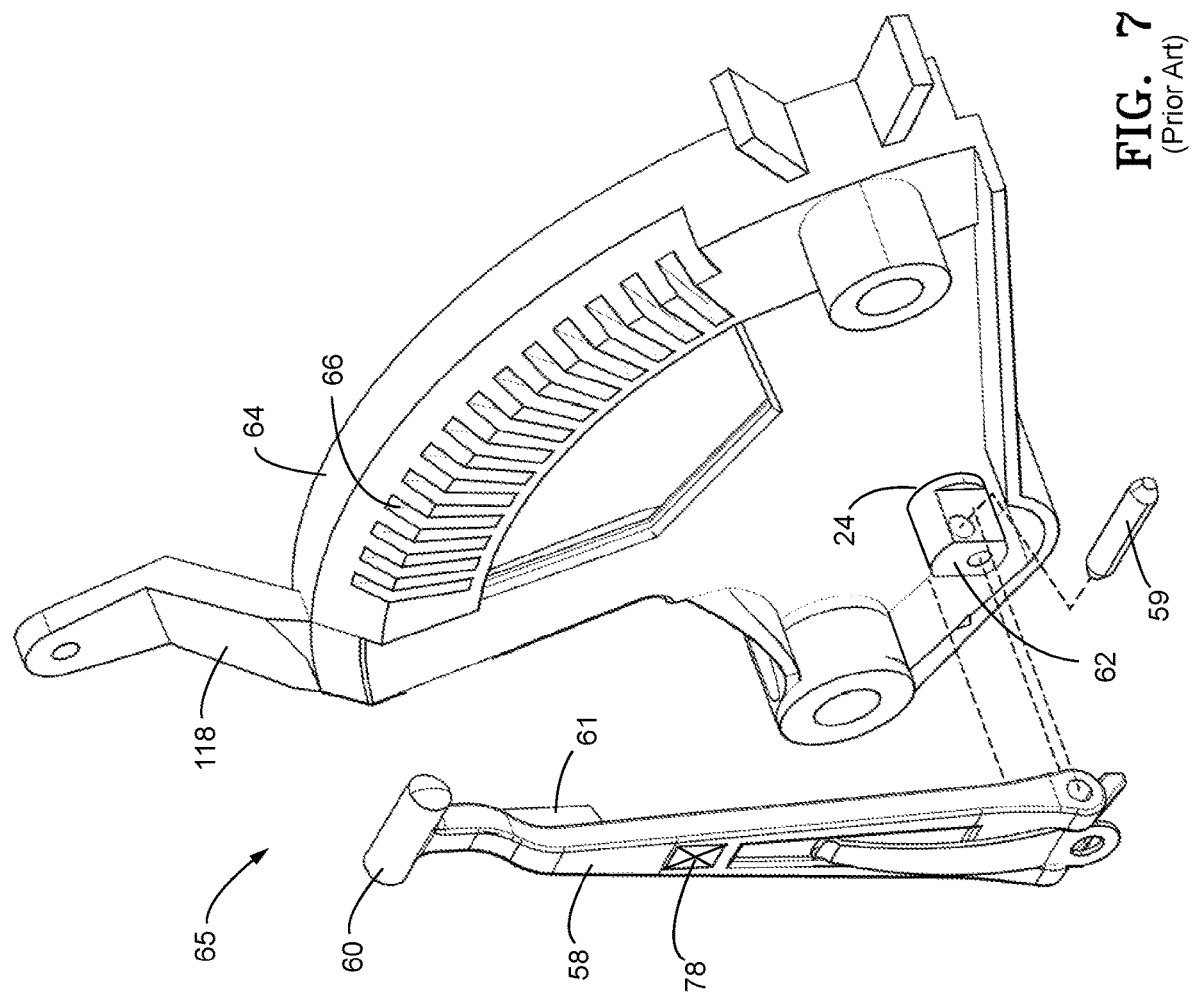
FIG. 7 is the same view of the depth adjustment assembly of FIG. 6 with components removed for clarity and showing the prior art method of having to remove and reinstall the instrumented depth setting arm if the load sensor fails or is otherwise damaged.

FIG. 6 is an enlarged partial perspective view of the depth adjustment assembly 65 of the prior art embodiments of FIGS. 2 and 5. FIG. 7 is the same view as FIG. 6, but with the disk 22, gauge wheel 56 and linkages 28 (FIG. 2 embodiment) or linkages 114, 112 (FIG. 5 embodiment) omitted for clarity. It should be appreciated that if the sensor 78 on the depth setting arm 58 becomes damaged or otherwise fails, the entire instrumented depth setting arm 58 must be removed and replaced. As shown in FIG. 7, in order to remove and replace the instrumented depth setting arm 58, the pin 59 needs to be removed to free the instrumented depth setting arm 58 from the crankshaft 62. To do so, two people are needed. One person is needed to hold crankshaft 62 through gauge wheel 56 and disk 22 while another person aligns depth setting arm 58 to remove the pin 59 so the instrumented depth setting arm 58 can be removed from the crankshaft 52 and a new instrumented depth setting arm 58 is then aligned onto the crankshaft 62 and the pin 59 reinserted.

Figure 8:
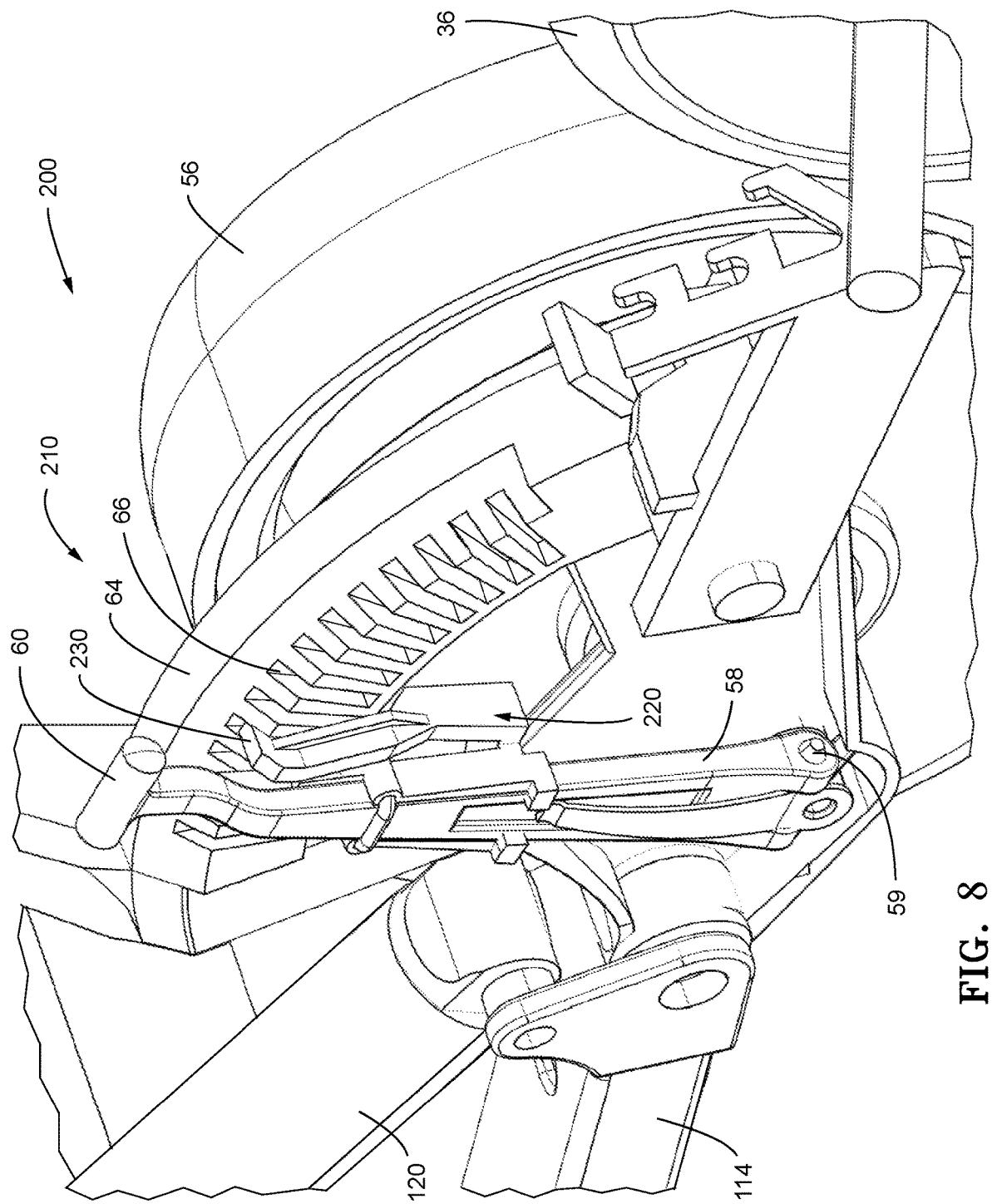
FIG. 8 is the same view of the depth adjustment assembly as in FIG. 6, but incorporating one embodiment of a load sensor bracket installed on the depth setting arm.

FIG. 8 is a perspective view of a modified or retrofitted row unit 200. The row unit 200 is substantially the same as the prior art row unit 20 of FIGS. 2 and 5, except that the depth adjustment assembly, designated generally by reference number 210, includes a load sensor bracket 220 removably installed on the depth setting arm 58. The same reference numbers are used in the embodiment of the retrofitted row unit 200 as used to designate the same or corresponding parts of the prior art row units 20 of FIGS. 2-5 and in the interest of brevity their descriptions will not be repeated herein. As discussed in detail later, the load sensor bracket 220 includes a load sensor 278, such as a strain gauge, (FIG. 10B) to provide the feedback to the CPU 88 in place of the sensor 78 on the depth setting arm 58 of the prior art embodiments of FIGS. 2 and 5.

FIG. 9 is the same view as FIG. 8, but with the disk 22, gauge wheel 56 and linkages 28 (FIG. 2 embodiment) or linkages 114, 112 (FIG. 5 embodiment) omitted for clarity and showing the depth setting arm 58 rotated outwardly for installation of the load sensor bracket 220 while the depth setting arm 58 remains mounted on the fan shaped member 64. Thus, it should be appreciated that the load sensor bracket 220 provides a more simplified retrofit installation of a means for instrumenting a depth setting arm 58 which can be accomplished quickly and easily by one person as compared to the prior art embodiment illustrated in FIG. 7 which requires two people to remove and replace the entire instrumented depth setting arm 58 as described above.

Turning to FIGS. 10A-10D, the load sensing bracket 220 comprises a body 222 with a cantilevered arm 224. The body 222 includes a back plate 226 and an extending bottom plate 228 to which the cantilevered arm 224 is connected. The cantilevered arm 224 has an inward projection 230 that engages with the outward facing notches 66 in the fan shaped member 64 (see FIG. 8). In this embodiment, the cantilevered arm 224 is disposed to one side of a vertical axis of the body 222, which may be on the right side of the vertical axis of the body 222 as shown, but the cantilevered arm 224 may alternatively be disposed on the left side of the vertical axis of the body 222.

Side plates 232, 234 project outwardly from the back plate 226 and are laterally spaced and configured to matingly receive and engage with the fore and aft sides of the depth setting arm 58. Outwardly projecting feet 236, 238 may be provided at lower ends of the side plates 232, 234 for engaging with the outward face of the depth setting arm 58 to more rigidly secure the body 222 to the depth setting arm 58. The upper ends of the sidewalls 232, 234 include channels 240, 242 for receiving the legs of a U-bolt 250 (FIG. 9). The legs of the U-bolt 250 extend through the channels 240, 242 and exit the back (inward facing) side of the back plate 226 through apertures 244, 246. Nuts 252 (FIG. 9) are threadably received over the ends of the legs of the U-bolt 250 such that the depth setting arm 58 is rigidly secured to the body 222 by the U-bolt 250, the side plates 232, 234, the back plate 226 and feet 236, 238.

Although in FIGS. 8-9 the bracket 220 is illustrated as being secured to the inward facing side of the depth setting arm 58 (i.e., between the depth setting arm 58 and the fan shaped member 64), it should be appreciated that the bracket 220 may be configured to secure to the outward facing side of the depth setting arm 58, with the feet 236, 238 engaging the inward facing side of the depth setting arm 58, and with the cantilevered arm 224 disposed to the right or left side of the body 222 as described above.

Figure 10B:
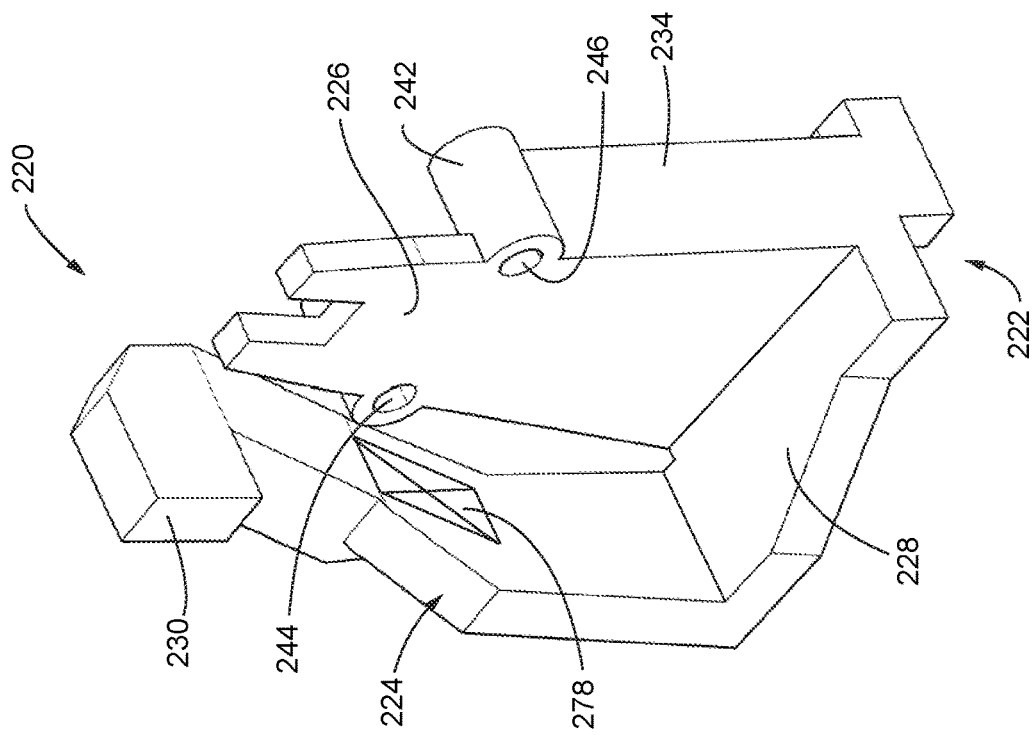
FIG. 10B is a rear perspective view of the load sensor bracket from FIG. 8.
Figure 10A:
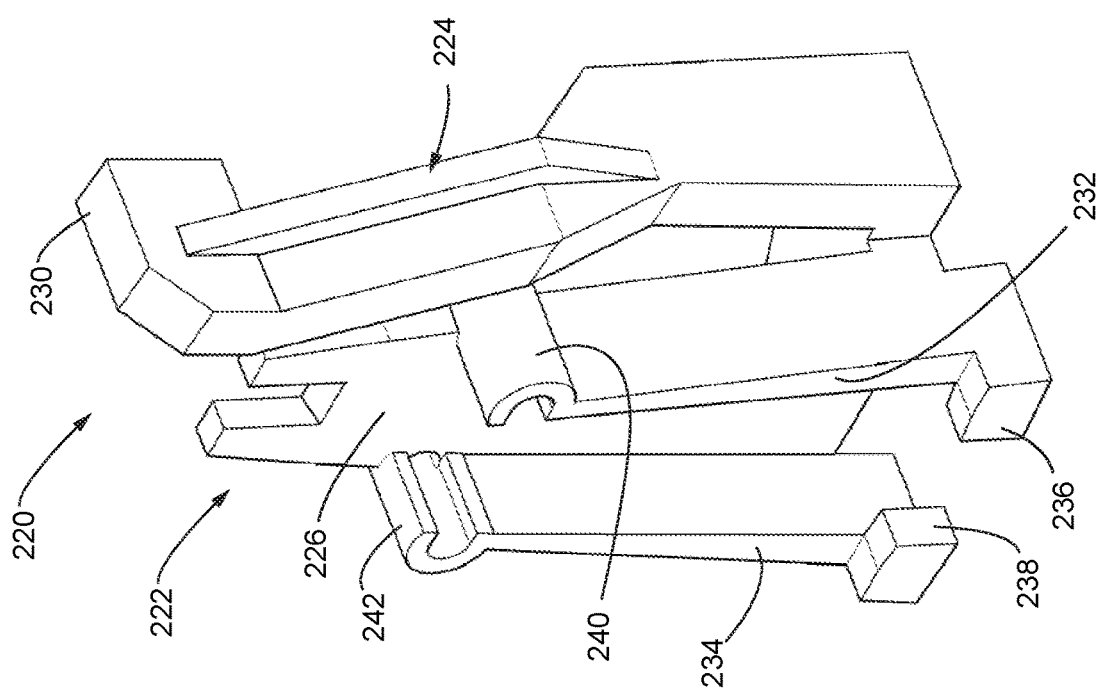
FIG. 10A is a front perspective view of the load sensor bracket from FIG. 8.
Figure 10D:
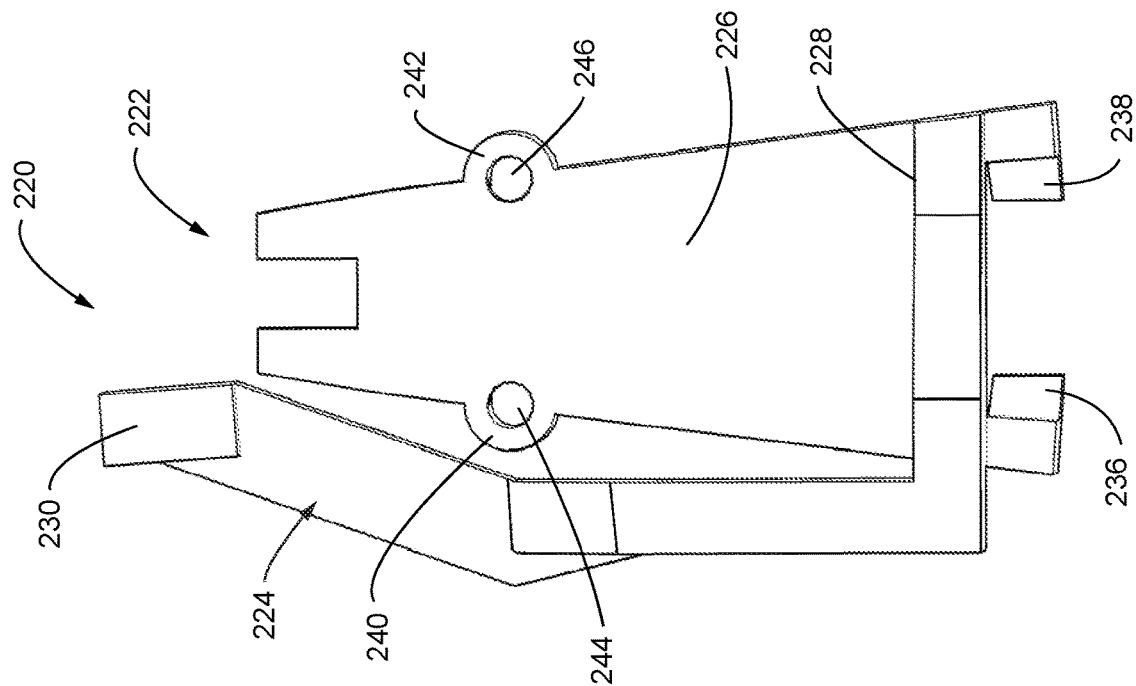
FIG. 10D is a rear elevation view of the bracket from FIG. 8.
Figure 10C:
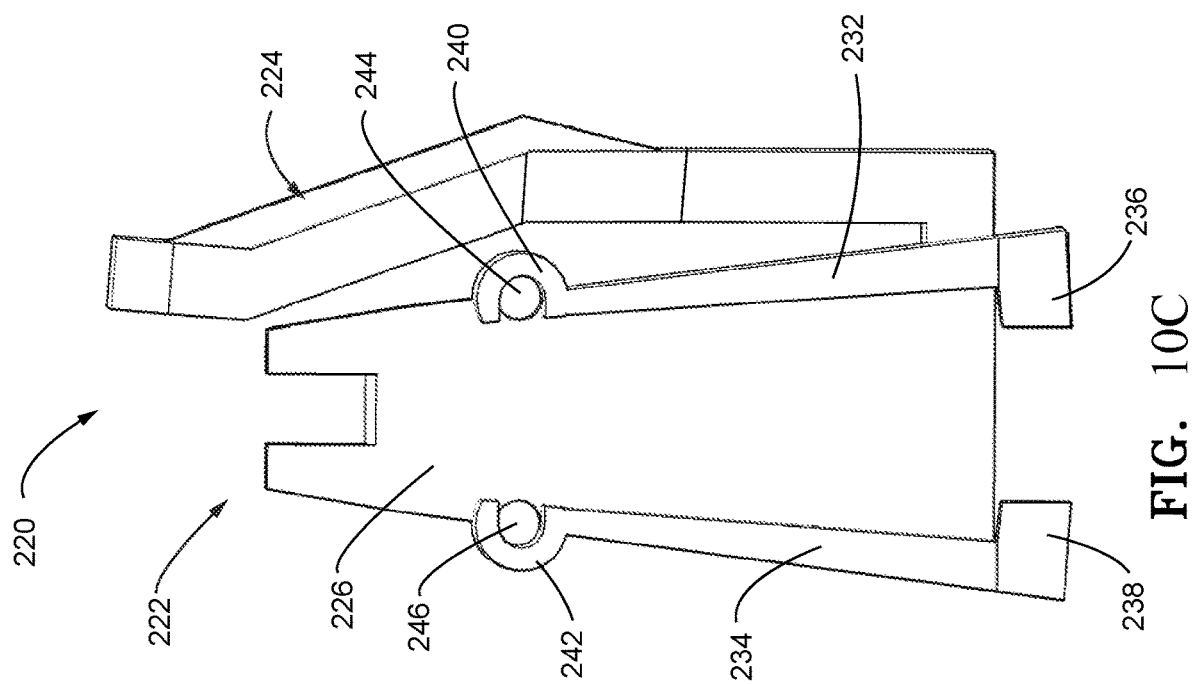
FIG. 10C is a front elevation view of the bracket from FIG. 8.

As best viewed in FIG. 10B, a sensor 278 is disposed on a face of the cantilevered arm 224 (e.g., a face toward the depth setting arm 54), however the sensor 278 may be disposed anywhere on the cantilevered arm 224. The sensor 278 may be a strain gauge, such as a Wheatstone bridge, or other suitable sensor that generates a signal corresponding to the strain, or load experienced by the cantilevered arm 224 as a result of the projection 230 of the cantilevered arm 224 being engaged with the teeth 66 of the fan shaped member 64 and the down force being applied on the row unit 200. The signal generated by the sensor 278 is communicated to CPU 88 in the same manner as described and illustrated in connection with the prior art embodiments of FIGS. 2-5 above. As described above, the hydraulic fluid flow to and from the cylinder 52 is controlled by a valve 90 and thus the CPU 88 opens and closes the valve 90 as needed to adjust the pressure in the cylinder 52 and thus the amount of down pressure applied on the disk 22 based on the strain, stress or load measured by the sensor 278 so the applied down pressure approaches the desired down pressure, thereby maintaining a relatively constant furrow depth and minimizing excessive down pressure on the gauge wheel.

Figure 11:
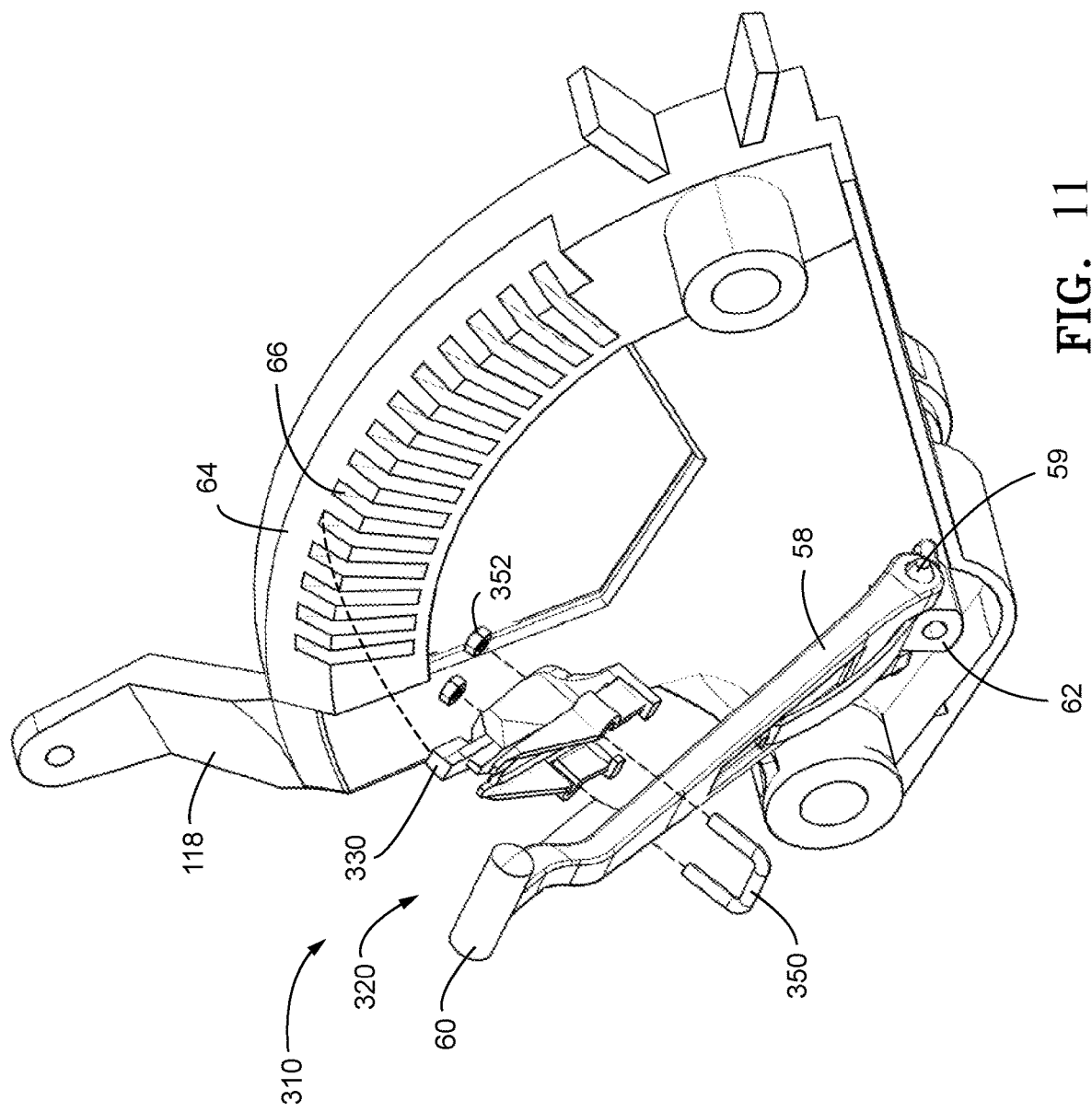
FIG. 11 is the same view of the depth adjustment assembly of FIG. 9, but showing another embodiment of the load sensor bracket mountable onto the depth setting arm without having to remove the depth setting arm.

FIG. 11 is a partially exploded partial perspective view of another embodiment of a depth adjustment assembly 310 similar to FIG. 9, but with an alternative embodiment of a load sensor bracket 320 removably mountable on the depth setting arm 58. As in FIG. 9, the disk 22, gauge wheel 56 and linkages 28 (FIG. 2 embodiment) or linkages 114, 112 (FIG. 5 embodiment) are omitted in the illustration of FIG. 11 for clarity. Also similar to FIG. 9, in FIG. 11, the depth setting arm 58 is shown rotated outwardly for installation of the load sensor bracket 320 while the depth setting arm 58 remains mounted on the fan shaped member 64. Thus, it should be appreciated that the load sensor bracket 320 provides a more simplified retrofit installation of a means for instrumenting a depth setting arm 58 which can be accomplished quickly and easily by one person as compared to the prior art embodiment illustrated in FIG. 7 which requires two people to remove and replace the entire instrumented depth setting arm 58 as described above.

Turning to FIGS. 12A-12D, the load sensing bracket 320 comprises a body 322 with a cantilevered arm 324. The body 322 includes a back plate 326 and an extending bottom plate or plates 328 to which the cantilevered arm 324 is connected. The cantilevered arm 324 has an inward projection 330 that engages with the outward facing notches 66 in the fan shaped member 64 (see FIG. 11). In this embodiment, the cantilevered arm 324 is disposed in substantial alignment with the vertical axis of the body 322 instead of to one side of the vertical axis as in the load sensor bracket 220 of FIG. 9.

Side plates 332, 334 project outwardly from the back plate 326 and are laterally spaced and configured to matingly receive and engage with the fore and aft sides of the depth setting arm 58. Outwardly projecting feet 336, 338 may be provided at lower ends of the side plates 332, 334 for engaging with the outward face of the depth setting arm 58 to more rigidly secure the body 322 to the depth setting arm 58. The upper ends of the sidewalls 332, 334 include channels 340, 342 for receiving the legs of a U-bolt 350 (FIG. 11). The legs of the U-bolt 350 extend through the channels 340, 342 and exit the back (inward facing) side of the back plate 326 through apertures 344, 346. Nuts 352 (FIG. 11) are threadably received over the ends of the legs of the U-bolt 350 such that the depth setting arm 58 is rigidly secured to the body 322 by the U-bolt 350, the side plates 332, 334, the back plate 326 and feet 336, 338.

Figure 12B:
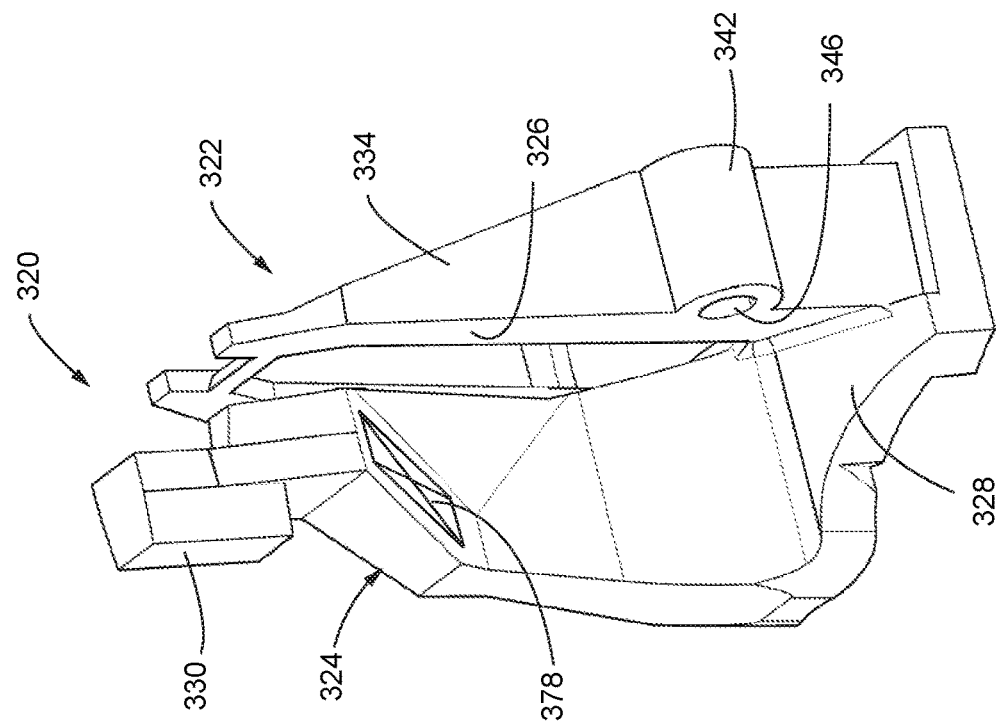
FIG. 12B is a rear perspective view of the load sensor bracket from FIG. 11.
Figure 12A:
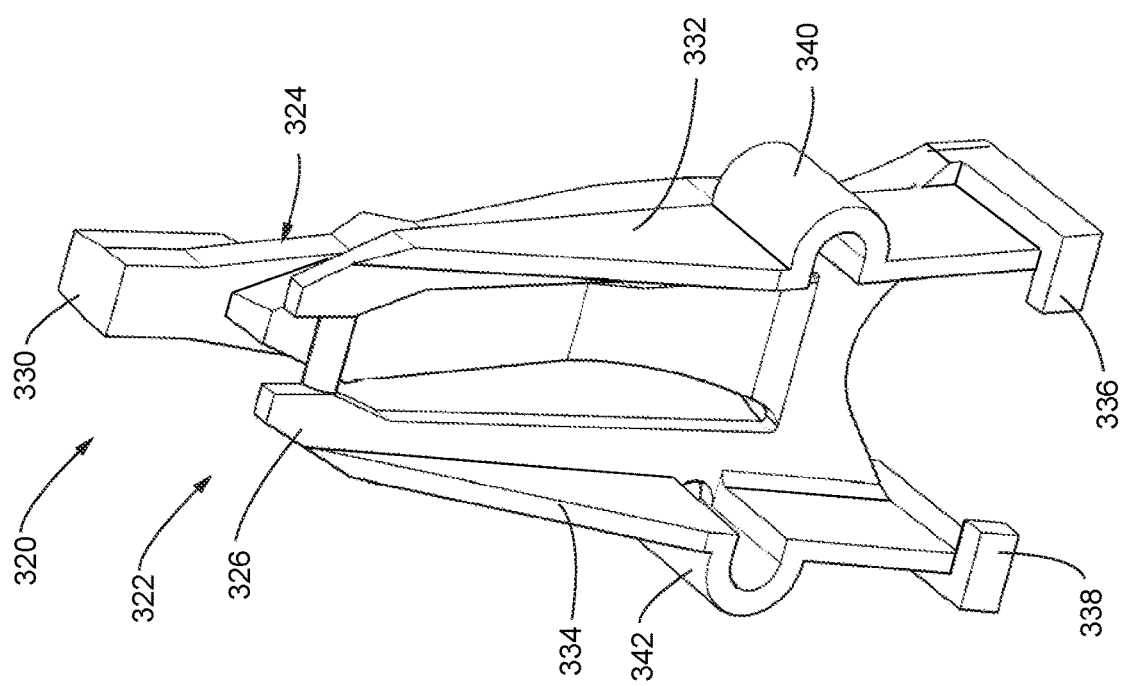
FIG. 12A is a front perspective view of the load sensor bracket from FIG. 11.
Figure 12D:
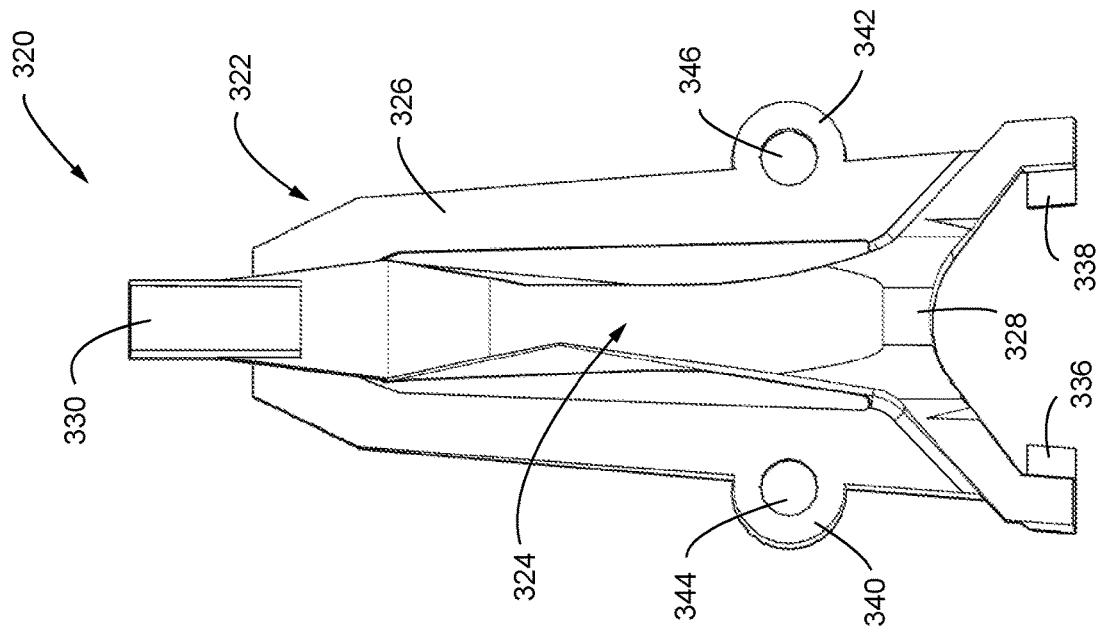
FIG. 12D is a rear elevation view of the bracket from FIG. 11.
Figure 12C:
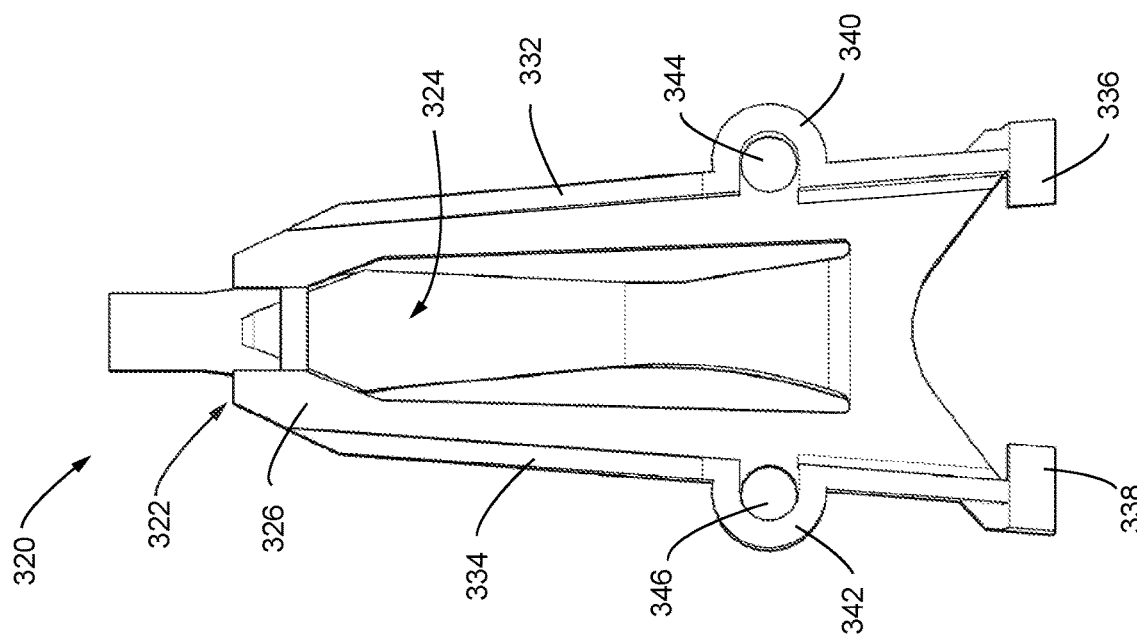
FIG. 12C is a front elevation view of the bracket from FIG. 11.

As best viewed in FIG. 12B, a sensor 378 is disposed on a face of the cantilevered arm 324 (e.g., a face toward the depth setting arm 58), however the sensor 378 may be disposed anywhere on the cantilevered arm 324. As in the previous embodiment, the sensor 378 may be a strain gauge, such as a Wheatstone bridge, or other suitable sensor that generates a signal corresponding to the strain, stress or load experienced by the cantilevered arm 324 as a result of the projection 330 of the cantilevered arm 324 being engaged with the teeth 66 of the fan shaped member 64 and the down force being applied on the row unit. The signal generated by the sensor 378 is communicated to CPU 88 in the same manner as described and illustrated in connection with the prior art embodiments of FIGS. 2-5 above. As described above, the hydraulic fluid flow to and from the cylinder 52 is controlled by a valve 90 and thus the CPU 88 opens and closes the valve 90 as needed to adjust the pressure in the cylinder 52 and thus the amount of down pressure applied on the disk 22 based on the strain, stress or load measured by the sensor 378.

Figure 13A:
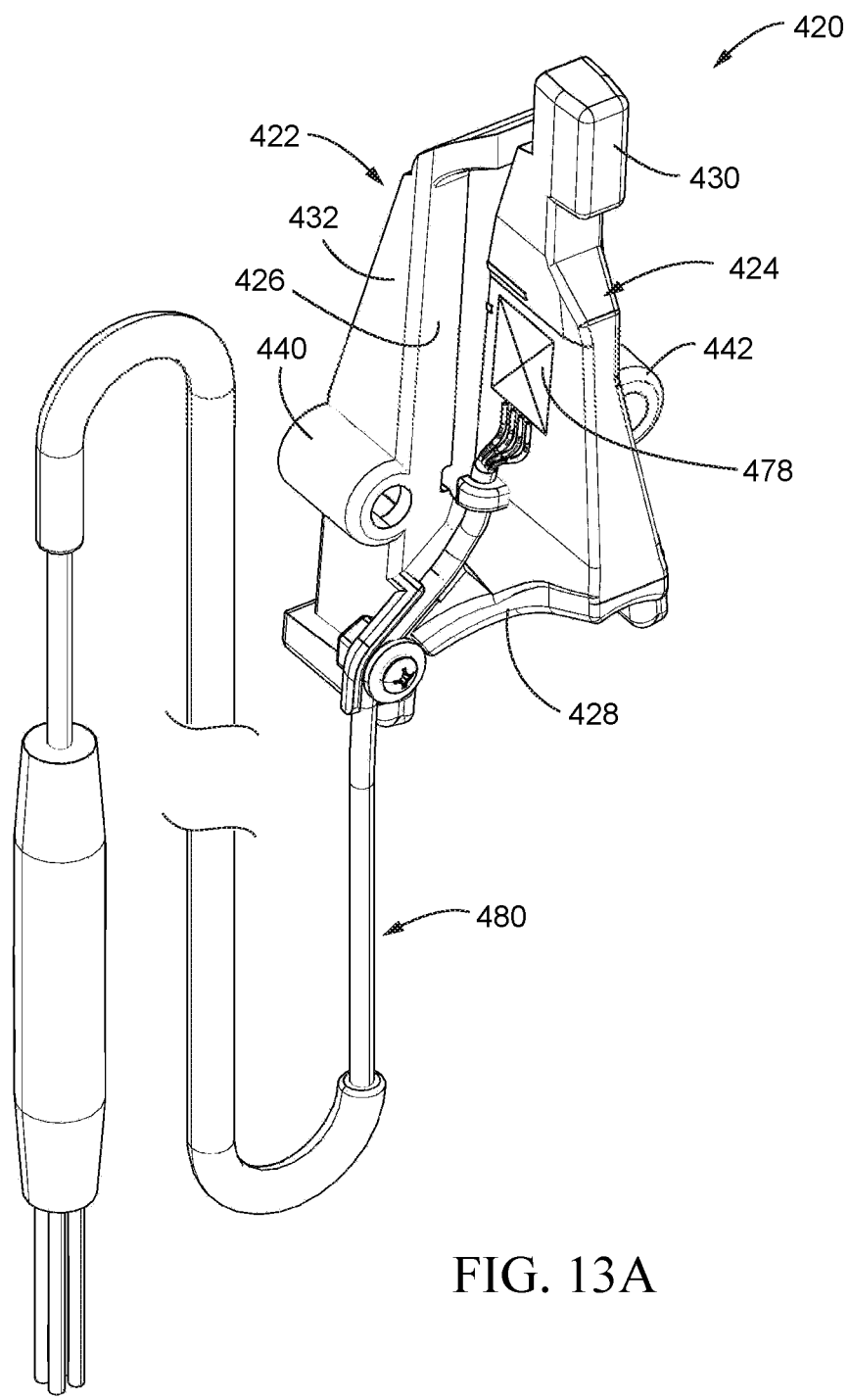
FIG. 13A is a front perspective view of another embodiment of a load sensor bracket substantially the same as disclosed in FIGS. 11 and 12A-12D, but further showing a wiring harness.
Figure 13B:
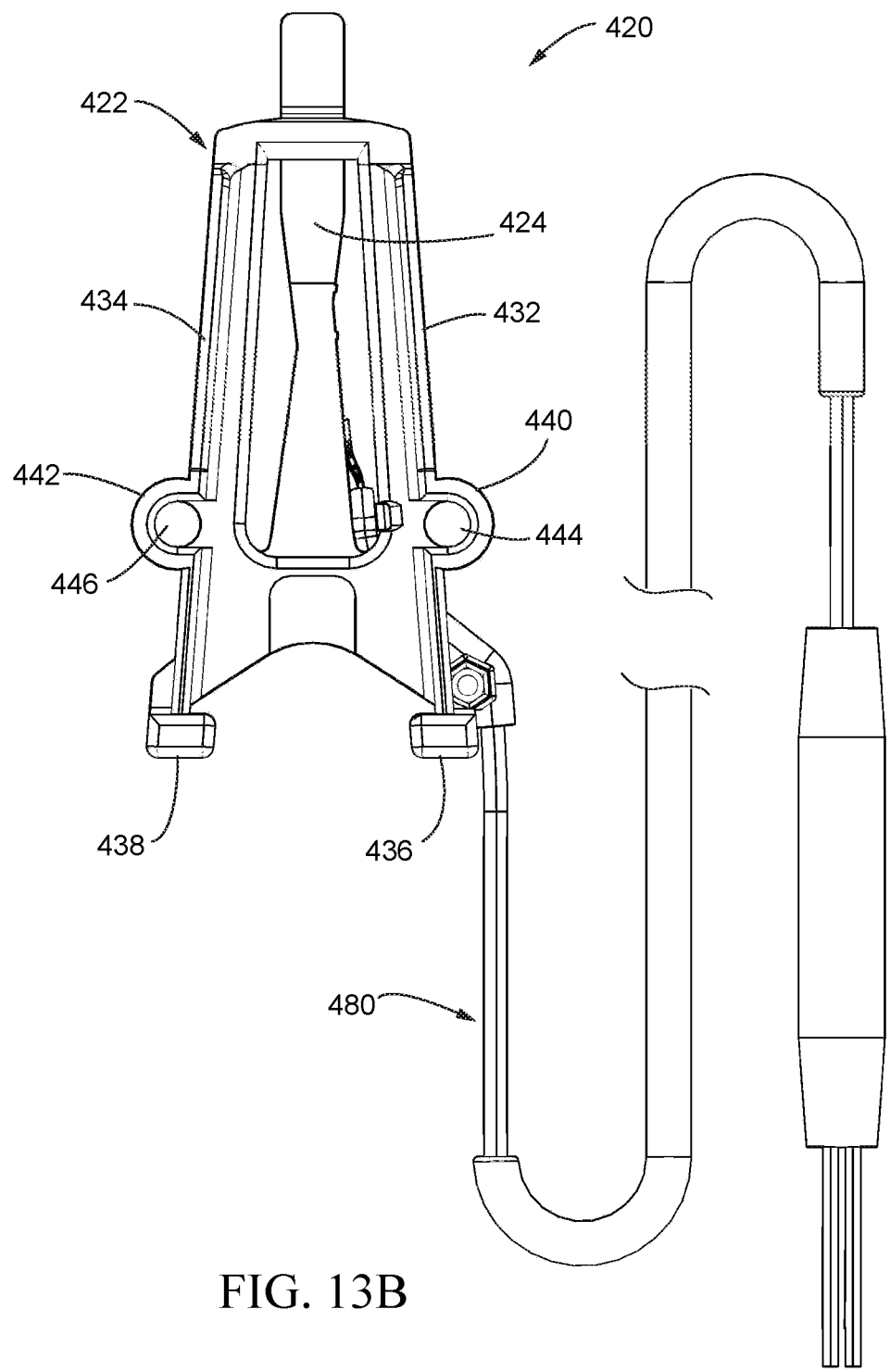
FIG. 13B is a rear perspective view of the embodiment of the load sensor bracket of FIG. 13A.

FIGS. 13A-13B illustrate another embodiment of a load sensing bracket 420 adapted to be removably mountable on the depth setting arm 58 in the same manner as the load sensor bracket 320 as depicted in FIG. 11. The load sensor bracket 420 is substantially the same as the previously described load sensor bracket 320 in that it comprises a body 422 with a cantilevered arm 424. The body 422 includes a back plate 426 and an extending bottom plate or plates 428 to which the cantilevered arm 424 is connected. The cantilevered arm 424 has an inward projection 430 that engages with the outwardly facing notches 66 in the fan shaped member 64 (see FIG. 11). As in the previously described load sensor bracket 320, in this embodiment, the cantilevered arm 424 is disposed in substantial alignment with the vertical axis of the body 422.

Side plates 432, 434 project outwardly from the back plate 426 and are laterally spaced and configured to matingly receive and engage with the fore and aft sides of depth setting arm 58. Outwardly projecting feet 436, 438 may be provided at lower ends of the side plates 432, 434 for engaging with the outer face of the depth setting arm 58 to more rigidly secure the body 422 to the depth setting arm 58. The upper ends of the sidewalls 432, 434 include channels 440, 442 for receiving the legs of a U-bolt 350 (FIG. 11). The legs of the U-bolt 350 extend through the channels 440, 442 and exit the back (inward facing) side of the back plate 426 through apertures 444, 446. Nuts 352 (FIG. 11) are threadably received over the ends of the legs of the U-bolt 350 such that the depth setting arm 58 is rigidly secured to the body 422 by the U-bolt 350, the side plates 432, 434, the back plate 426 and feet 436, 438.

As best viewed in FIG. 13A, a sensor 478 is disposed on a face of the cantilevered arm 424, however the sensor 478 may be disposed anywhere on the cantilevered arm 424. As in the previous embodiment, the sensor 478 may be a strain gauge, such as a Wheatstone bridge, or other suitable sensor that generates a signal corresponding to the strain, stress or load experienced by the cantilevered arm 424 as a result of the projection 430 of the cantilevered arm 424 being engaged with the teeth 66 of the fan shaped member 64 and the down force being applied on the row unit. The signal generated by the sensor 478 is communicated via a wiring harness 480 to CPU 88 in the same manner as described and illustrated in connection with the prior art embodiments of FIGS. 2-5 above. As described above, the hydraulic fluid flow to and from the cylinder 52 is controlled by a valve 90 and thus the CPU 88 opens and closes the valve 90 as needed to adjust the pressure in the cylinder 52 and thus the amount of down pressure applied on the disk 22 based on the strain, stress or load measured by the load sensor 478.

Various modifications to the embodiments and the general principles and features of the apparatus, systems and methods described herein will be readily apparent to those of skill in the art. Thus, the foregoing description is not to be limited to the embodiments of the apparatus, systems and methods described herein and illustrated in the drawing figures.

The invention claimed is:

1. A load sensing bracket for a disk opener assembly of an agricultural implement, the disk opener assembly comprising a disk, a gauge wheel, a fan shaped member having a plurality of notches, and a depth setting arm coupled to the gauge wheel, the load sensing bracket comprising:
   a body having a cantilevered arm, the body configured to engage with and secure to a portion of the depth setting arm, the cantilevered arm having an upper end with an extending projection, the extending projection received in any one of the plurality of notches of the fan shaped member thereby setting a position of the depth setting arm relative to the fan shaped member which sets a position of the gauge wheel relative to the disk, wherein raising of the gauge wheel relative to the disk increases a cutting depth of the disk into a soil surface and wherein lowering the gauge wheel relative to the disk reduces the cutting depth of the disk into the soil surface;
   a sensor disposed on the cantilevered arm generating a signal relating to strain in the cantilevered arm which corresponds to a down pressure on the gauge wheel.

2. The load sensing bracket of claim 1, wherein the cantilevered arm is disposed to one side of a vertical axis of the body.

3. The load sensing bracket of claim 2, wherein the body includes laterally spaced side plates configured to receive and engage with opposing fore and aft sides of the depth setting arm.

4. The load sensing bracket of claim 3, wherein a lower end of each of the laterally spaced side plates includes a foot configured to engage with an inward face of the depth setting arm.

5. The load sensing bracket of claim 4, wherein an upper end of the body is adapted to be secured by a U-bolt to the depth setting arm, whereby the laterally spaced side plates, each foot and the U-bolt cooperate to rigidly, yet removably secure the body to the depth setting arm.

6. The load sensing bracket of claim 1, wherein the cantilevered arm is disposed in substantial alignment with a vertical axis of the body.

7. The load sensing bracket of claim 6, wherein the body includes laterally spaced side plates configured to receive and engage with opposing fore and aft sides of the depth setting arm.

8. The load sensing bracket of claim 7, wherein a lower end of each of the laterally spaced side plates includes a foot configured to engage with an outward face of the depth setting arm.

9. The load sensing bracket of claim 8, wherein an upper end of the body is adapted to be secured by a U-bolt to the depth setting arm, whereby the laterally spaced side plates, each foot and the U-bolt cooperate to rigidly, yet removably secure the body to the depth setting arm.

10. A disk opener assembly for an agricultural implement, comprising:
    a) a disk configured to cut a furrow into a soil surface as the agricultural implement travels in a forward direction of travel;
    b) a gauge wheel;
    c) a fan shaped member having a plurality of outwardly facing notches;
    d) a depth setting arm coupled to the gauge wheel;
    e) a down pressure control system settable to a desired down pressure on the gauge wheel;
    f) a load sensing bracket comprising:
        i) a body having a cantilevered arm, the body configured to engage with and secure to a portion of the depth setting arm, the cantilevered arm having an upper end with an extending projection, the extending projection received in any one of the plurality of notches of the fan shaped member thereby setting a position of the depth setting arm relative to the fan shaped member which sets a position of the gauge wheel relative to the disk, wherein raising of the gauge wheel relative to the disk increases a cutting depth of the disk into a soil surface and wherein lowering the gauge wheel relative to the disk reduces the cutting depth of the disk into the soil surface;
        ii) a sensor disposed on the cantilevered arm generating a signal relating to strain in the cantilevered arm which corresponds to an applied down pressure on the gauge wheel, the sensor in signal communication with the down pressure control system;
    whereby the down pressure control system automatically adjusts the applied down pressure on the gauge wheel based on the generated signals so the applied down pressure approaches the desired down pressure, thereby maintaining a relatively constant furrow depth and minimizing excessive down pressure on the gauge wheel.

11. The disk opener assembly of claim 10, wherein the cantilevered arm is disposed to one side of a vertical axis of the body.

12. The disk opener assembly of claim 11, wherein the body includes laterally spaced side plates configured to receive and engage with opposing fore and aft sides of the depth setting arm.

13. The disk opener assembly of claim 12, wherein a lower end of each of the laterally spaced side plates includes a foot configured to engage with an inward face of the depth setting arm.

14. The disk opener assembly of claim 13, wherein an upper end of the body is adapted to be secured by a U-bolt to the depth setting arm, whereby the laterally spaced side plates, each foot and the U-bolt cooperate to rigidly, yet removably secure the body to the depth setting arm.

15. The disk opener assembly of claim 10, wherein the cantilevered arm is disposed in substantial alignment with a vertical axis of the body.

16. The disk opener assembly of claim 15, wherein the body includes laterally spaced side plates configured to receive and engage with opposing fore and aft sides of the depth setting arm.

17. The disk opener assembly of claim 16, wherein a lower end of each of the laterally spaced side plates includes a foot configured to engage with an outward face of the depth setting arm.

18. The disk opener assembly of claim 17, wherein an upper end of the body is adapted to be secured by a U-bolt to the depth setting arm, whereby the laterally spaced side plates, each foot and the U-bolt cooperate to rigidly, yet removably secure the body to the depth setting arm.

* * * * *